United States Patent
Stanton

(10) Patent No.: US 8,705,391 B2
(45) Date of Patent: Apr. 22, 2014

(54) REDUCING LATENCY OF AT LEAST ONE STREAM THAT IS ASSOCIATED WITH AT LEAST ONE BANDWIDTH RESERVATION

(75) Inventor: Kevin B. Stanton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 13/071,247

(22) Filed: Mar. 24, 2011

(65) Prior Publication Data

US 2012/0243557 A1  Sep. 27, 2012

(51) Int. Cl.
  *H04J 1/16* (2006.01)
  *H04L 12/28* (2006.01)

(52) U.S. Cl.
  USPC ............ 370/252; 370/401; 370/455; 370/468

(58) Field of Classification Search
  USPC .................................. 370/252, 401, 455, 468
  See application file for complete search history.

(56) References Cited

U.S. PATENT DOCUMENTS

| | | | |
|---|---|---|---|
| 7,136,382 B1 * | 11/2006 | Sharma et al. | 370/392 |
| 7,738,473 B2 * | 6/2010 | Nielsen | 370/413 |
| 2005/0169257 A1 * | 8/2005 | Lahetkangas et al. | 370/389 |
| 2006/0168337 A1 * | 7/2006 | Stahl et al. | 709/240 |
| 2006/0198353 A1 * | 9/2006 | Wason et al. | 370/347 |
| 2007/0133563 A1 * | 6/2007 | Hundscheidt et al. | 370/395.43 |
| 2008/0037567 A1 * | 2/2008 | Cho et al. | 370/401 |
| 2008/0219176 A1 * | 9/2008 | Yamada | 370/252 |
| 2008/0235699 A1 | 9/2008 | Jeong et al. | |
| 2008/0288638 A1 | 11/2008 | Diab et al. | |
| 2008/0291829 A1 * | 11/2008 | Hammar | 370/235 |
| 2008/0298241 A1 | 12/2008 | Ohana et al. | |
| 2009/0022136 A1 * | 1/2009 | Joshi et al. | 370/348 |
| 2009/0049175 A1 | 2/2009 | Finn | |
| 2009/0323532 A1 * | 12/2009 | Lai | 370/235 |
| 2012/0011351 A1 * | 1/2012 | Mundra et al. | 713/1 |
| 2012/0099605 A1 | 4/2012 | Stanton | |

FOREIGN PATENT DOCUMENTS

| | | | |
|---|---|---|---|
| WO | 2012054389 A1 | 4/2012 | |
| WO | 2012/054389 A3 | 6/2012 | |

OTHER PUBLICATIONS

International Search Report & Written Opinion received for PCT Application No. PCT/US2011/056544, mailed on Apr. 18, 2012, 8 pages.

IEEE P802.1Qat/D6.0, Draft Standard for Local and Metropolitan Area Networks; "Virtual Bridged Local Area Networks—Amendment XX: Stream Reservation Protocol (SRP)"; LAN/MAN Standards Committee of the IEEE Computer Society; Apr. 23, 2010; 100 pages.

(Continued)

*Primary Examiner* — Andrew Lee
(74) *Attorney, Agent, or Firm* — Christopher K. Gagne

(57) ABSTRACT

An embodiment may include circuitry to determine, at least in part, whether to delay transmission, at least in part, of at least one frame in favor of transmitting at least one other frame. The at least one other frame may belongs to at least one packet stream that is associated with at least one bandwidth reservation. The transmission of the at least one frame may be timed to occur prior to the transmitting of the at least one other frame. The at least one frame, at the time that it is selected for transmission, may have a relatively higher transmission priority than a relatively lower transmission priority of the at least one other frame. Many modifications, variations, and alternatives are possible without departing from this embodiment.

21 Claims, 2 Drawing Sheets

(56) References Cited

OTHER PUBLICATIONS

Goetz, Franz Josef; IEEE 802.1 Interim Meeting; "AVB for Industrial Communication Networks part 1—requirements for low latency streams"; May 26, 2010; 12 pages.
IEEE Std 802.1Qav™-2009; IEEE Standard for Local and metropolitan area networks; "Virtual Bridged Local Area Networks Amendment 12: Forwarding and Queuing Enhancements for Time-Sensitive Streams"; LAN/MAN Standards Committee of the IEEE Computer Society; Jan. 5, 2010; 71 pages.
Kleineberg, Oliver; IEEE 802.1 Interim Meeting; "AVB for low latency networks: part 2—requirements for media redundancy"; Hirschmann Automation & Control; May 2010; 7 pages.
IEEE 802; "Calculating the Delay Added by Qav Stream Queue"; Aug. 26, 2009; 4 pages; retrieved from: http://www.ieee802.org/1/files/public/docs2009/.
Pannell, Don; 802.1 AVB Face to Face; "AVB Latency Math"; Version 5; Nov. 2010; 43 pages.
Pannell, Don; 802.1 AVB Face to Face; "AVB—Generation 2 Latency Improvement Options"; Version 1; Mar. 2011; 46 pages.
"Draft Standard for Local and Metropolitan Area Networks—Virtual Bridged Local Area Networks—Amendment XX: Stream Reservation Protocol (SRP)," IEEE P802.1Qat/D6.0, Prepared by the Audio/Video Bridging Task Group of IEEE 802.1, Apr. 23, 2010, 108 pages.
"IEEE Standard for Local and metropolitan area networks—Virtual Bridged Local Area Networks—Amendment 12: Forwarding and Queuing Enhancements for Time-Sensitive Streams," IEEE Std 802.1Qav™-2009 (Amendment to IEEE Std 802.1Q™-2005), Jan. 5, 2010, 87 pages.
Goetz, "AVB for Industrial Communication Networks—Part 1—Requirements for Low Latency Streams," Siemens, IEEE 802.1 Interim Meeting, Geneva, May 26, 2010, pp. 1-12.
Kleineberg, "AVB for low latency networks: Part 2—Requirements for Media Redundancy," Hirschmann Automation & Control, IEEE 802.1 Interim Meeting, Geneva, May 2010, pp. 1-7.
Fuller, "Calculating the Delay Added by Qav Stream Queue," IEEE 802.1 Qav Presentation, Aug. 12, 2009, 4 pages.
Pannell, "AVB Latency Math," Marvell, vol. 5, 802.1 AVB Face to Face—Dallas, TX, Nov. 2010, pp. 1-43.
Pannell, "AVB—Generation 2 Latency Improvement Options," Marvell, vol. 1, 802.1 AVB Face to Face—Singapore, Mar. 2011, pp. 1-46.
Stanton, "Reducing the maximum latency of reserved streams," U.S. Appl. No. 12/910,427, filed Oct. 22, 2010, 24 pages.
International Preliminary Report on Patentability received for PCT Patent Application No. PCT/US2011/056544, mailed on May 2, 2013. 6 pages.

\* cited by examiner

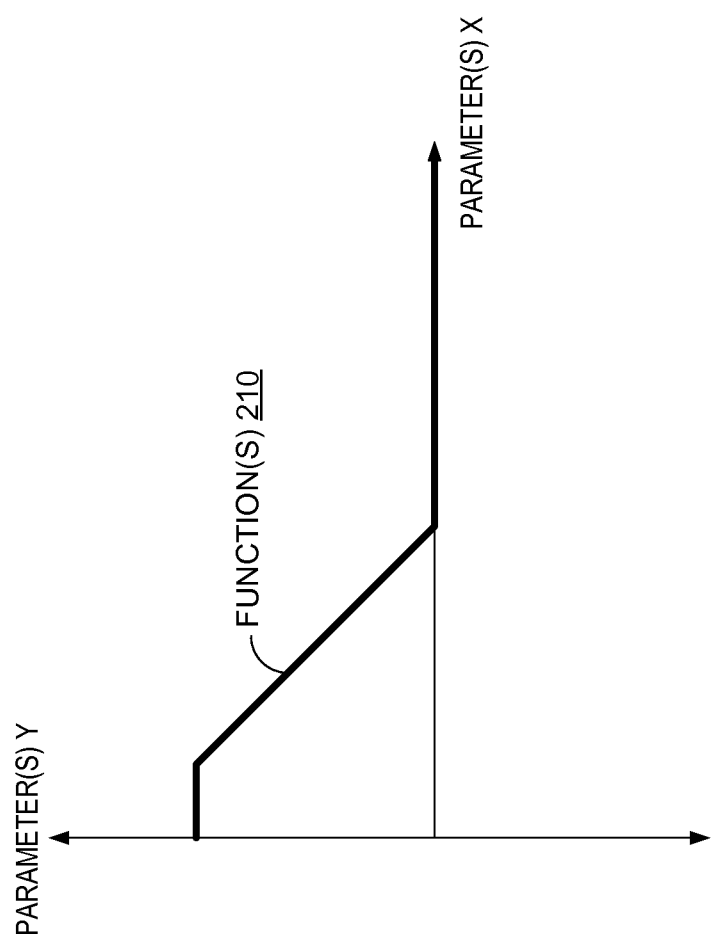

REDUCING LATENCY OF AT LEAST ONE STREAM THAT IS ASSOCIATED WITH AT LEAST ONE BANDWIDTH RESERVATION

FIELD

This disclosure relates to reducing the latency of at least one stream that is associated with at least one bandwidth reservation.

BACKGROUND

One conventional network arrangement, e.g., a Bridged Ethernet network, permits a certain percentage (e.g., 75 percent) of network bandwidth to be set aside for reservation to one or more communication streams. In this arrangement, the transmissions of frames in the streams that have such reservations may be timed in such a way as to evenly distribute their transmissions within an observation interval, subject to other communication that may interfere with the communication streams, and based upon the total amount of bandwidth that is actually reserved. For example, according to this arrangement, if the total available bandwidth is 1 gigabit per second and the certain percentage is 75 percent, 750 megabits per second are available for possible reservation, and the total bandwidth that is actually reserved is 100 megabits per second, then the arrangement will allocate 10 percent of the total frame transmission time to transmission of frames belonging to streams that have reservations, and the transmissions of such frames will be evenly distributed (subject to the rules of the transmission medium and pending completion of transmission of already-in-flight or higher priority frames) within the allocated 10 percent of the total frame transmission time and the interval over which the bandwidth reservation is specified (e.g., the observation interval).

In this conventional arrangement, multiple frames (including the final frame) in a given stream may be received and contemporaneously queued at a given intermediate hop before being transmitted from the hop. If these frames include the final frame, the final frame may remain queued for transmission in the hop until after all other frames in the stream have been transmitted from the hop. If, after all of the other frames in the stream have been transmitted from the hop, but the final frame has yet to be transmitted from the hop, a relatively higher priority frame (e.g., relative to the current transmission priority of or credits associated with the final frame) is selected for transmission from the hop, the final frame in the stream may not be transmitted until after the relatively higher priority frame has been transmitted. This may increase the latency of the final frame and/or the stream. This increased latency of the final frame and/or stream may be exacerbated if the relatively higher priority frame has a relatively large size that consumes a relatively large amount of time to be transmitted from the hop (e.g., relative to the size and transmission time of the final frame). This may often be the case, since it is not uncommon for such a final frame to be an order of magnitude smaller in size than the largest permitted Ethernet frame. Additional latencies may be introduced, for similar and/or analogous reasons, at multiple of the stream's hops. The resultant aggregated latency of the final frame and/or stream may be significant.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 2 illustrates features in an embodiment.

Figure 1:
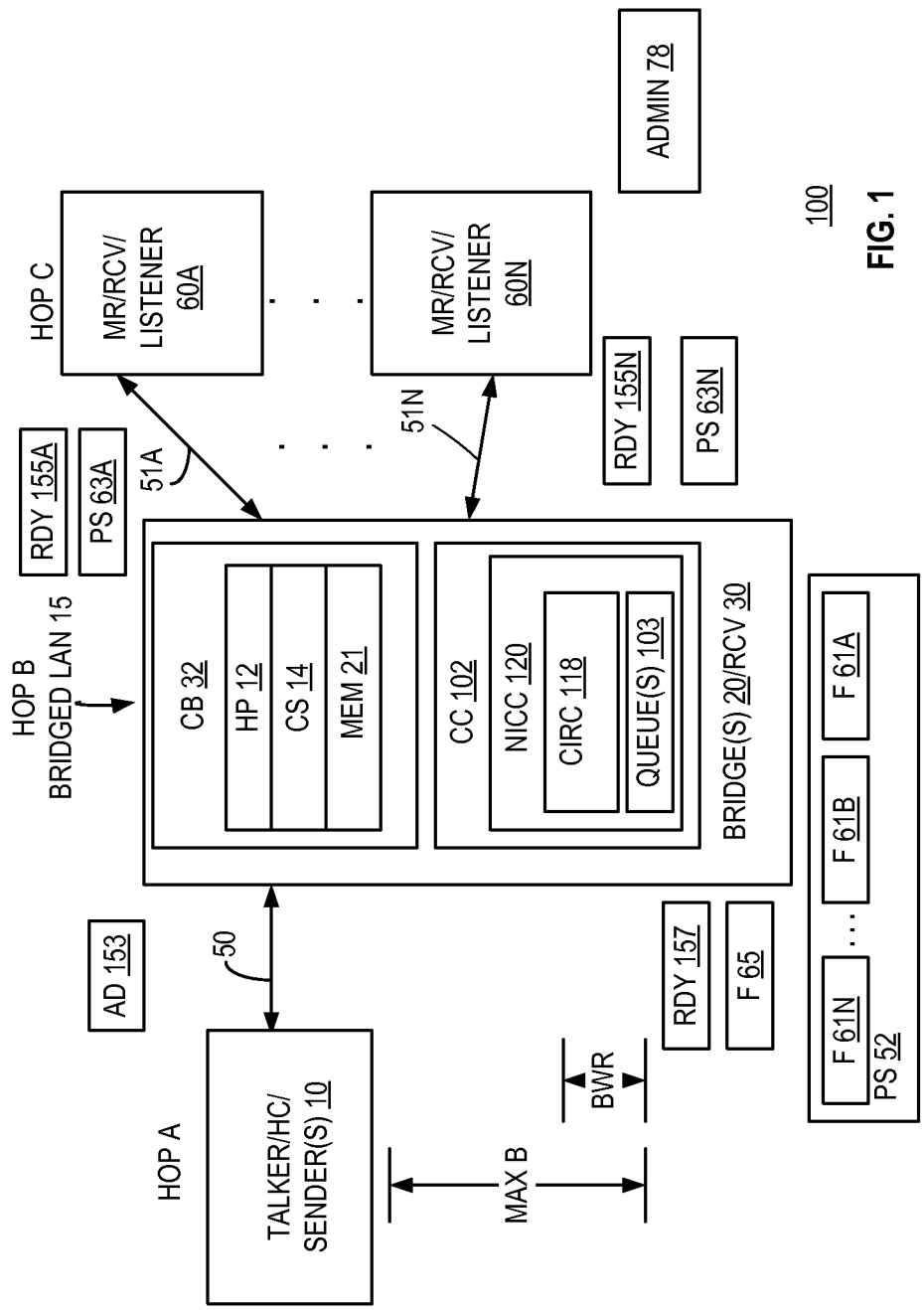
FIG. 1 illustrates a system embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

FIG. 1 illustrates a system embodiment 100. System 100 may include one or more host computers (HC) 10 that may be communicatively coupled to one or more receivers (RCV) 30 via one or more wireless and/or wired network communication links 50. One or more receivers 30 may be communicatively coupled to one or more (and in this embodiment, a plurality of) other receivers 60A ... 60N via one or more (and in this embodiment, a plurality of) wireless and/or wired network communication links 51A ... 51N. In this embodiment, one or more HC 10 may be or comprise one or more senders of one or more packet streams (PS) 52, and one or more receivers 30 and/or 60A ... 60N may be or comprise one or more intended receivers of one or more of these streams. Also in this embodiment, one or more HC 10 may be or comprise one or more "talkers," and one or more receivers 60A ... 60N may be or comprise one or more media renderer (MR) "listeners," in accordance with, for example, Amendment 12: Forwarding and Queuing Enhancements for Time-Sensitive Streams, Institute of Electrical and Electronics Engineers, Inc. (IEEE) Std. 802.1Qav-2009, approved 9 Dec. 2009 (hereinafter, "Time-Sensitive Steam Protocol" or "TSSP"). One or more receivers 30 may be or comprise one or more bridges 20 that together with MR 60A ... 60N may be comprised in bridged local area network (LAN) 15. System 100 may also comprise administrator 78. Although not shown in the Figures, it should be understood that administrator 78 may be communicatively coupled to one or more receivers 30, HC 10, and/or MR 60A ... 60N.

In this embodiment, one or more HC 10, receivers 30, and/or MR 60A ... 60N may be geographically remote from each other. In an embodiment, the terms "host computer," "host," "server," "client," "network node," "end station," "intermediate station," and "node" may be used interchangeably, and may mean, for example, without limitation, one or more end stations, mobile internet devices, smart phones, media (e.g., audio and/or video) devices, input/output (I/O) devices, tablet computers, appliances, intermediate stations, network interfaces, clients, servers, and/or portions thereof. Also in this embodiment, a "sender" may be capable, at least in part, of transmitting, at least in part, one or more packets to one or more "receivers," and a "receiver" may be capable, at least in part, of receiving, at least in part, the one or more packets. In this embodiment, a "bridge" and "switch" may be used interchangeably, and may comprise an intermediate station that is capable, at least in part, of receiving, at least in part, one or more packets from one or more senders, and transmitting, at least in part, the one or more packets to one or more receivers. In this embodiment, a "media renderer" may comprise one or more host computers capable, at least in part, of (1) processing, at least in part, data that may be associated, at least in part, with, (2) encoding, at least in part, audio, video, graphic, display, tactile, image, and/or other and/or additional types of information, and/or (3) decoding, at least in part, such information, where such information may be intended to be, amenable to, and/or capable of, at least in part, human sensory perception, audio and/or video playback and/or recording, and/or other physical measurement and/or stimulus.

In this embodiment, a "network" may be or comprise any mechanism, instrumentality, modality, and/or portion thereof that may permit, facilitate, and/or allow, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

In this embodiment, one or more senders 10, one or more receivers 30/one or more bridges 20, and/or one or more listeners 60A . . . 60N may be, constitute, or comprise one or more respective network hops (e.g., HOP A, HOP B, and HOP C, respectively) from and/or to which one or more PS 52 may be propagated. In this embodiment, a hop or network hop may be or comprise one or more nodes in a network to and/or from which one or more packets may be transmitted (e.g., in furtherance of reaching and/or to reach an intended destination).

One or more bridges 20 may comprise circuit board (CB) 32 and one or more circuit cards (CC) 102. In this embodiment, CB 32 may comprise, for example, a system motherboard that may be physically and communicatively coupled to one or more CC 102 via a not shown bus connector/slot system. CB 32 may comprise one or more single and/or multi-core host processors (HP) 12 and computer-readable/writable memory 21. CB 32 also may comprise one or more chipsets (CS) 14 which may comprise, e.g., memory, input/output controller circuitry, and/or network interface controller circuitry (NICC). One or more host processors 12 may be communicatively coupled via the one or more chipsets 14 to memory 21 and CC 102. CC 102 may comprise NICC 120. NICC 120 may comprise one or more queues 103 and/or operative circuitry 118.

Alternatively or additionally, although not shown in the Figures, some or all of circuitry 118 and/or the functionality and components thereof may be comprised in, for example, CB 32 (e.g., in one or more host processors 12 and/or the one or more chipsets 14). Also alternatively, one or more host processors 12, memory 21, the one or more chipsets 14, and/or some or all of the functionality and/or components thereof may be comprised in, for example, circuitry 118 and/or one or more CC 102. Further alternatively, NICC 120 and/or one or more queues 103 may comprised, at least in part, in circuitry 118. Many other alternatives are possible without departing from this embodiment.

One or more HC 10 and/or one or more MR 60A . . . 60N each may comprise respective components that may be identical or substantially similar, at least in part, in their respective constructions, operations, and/or capabilities to the respective construction, operation, and/or capabilities of the above described (and/other other) components of one or more receivers 30 and/or bridges 20. Of course, alternatively, without departing from this embodiment, the respective constructions, operations, and/or capabilities of one or more HC 10 and/or MR 60A . . . 60N (and/or one or more components thereof) may differ, at least in part, from the respective construction, operation, and/or capabilities of one or more receivers 30 and/or bridges 20 (and/or one or more components thereof).

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a host processor, processor, processor core, core, and/or controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, two or more of the following: one or more host processors, storage, mass storage, one or more nodes, and/or memory. Although not shown in the Figures, one or more receivers 30 may comprise a graphical user interface system. The not shown graphical user interface system may comprise, e.g., a respective keyboard, pointing device, and display system that may permit a human user to input commands to, and monitor the operation of, one or more hosts 10, receivers 30, bridges 20, MR 60A . . . 60N, and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, one or more random access memory cells (e.g., embedded in one or more integrated circuit chips that may implement at least in part controller and/or switch functionality), and/or other or later-developed computer-readable and/or writable memory. One or more machine-readable program instructions may be stored in memory 21 and/or circuitry 118. In operation of one or more receivers 30 and/or one or more bridges 20, these instructions may be accessed and executed by one or more host processors 12 and/or circuitry 118. When executed by one or more host processors 12 and/or circuitry 118, these one or more instructions may result in one or more host processors 12, circuitry 118, and/or one or more components thereof, performing operations described herein as being performed by these components of system 100.

In this embodiment, a portion, subset, or fragment of an entity may comprise all of, more than, or less than the entity. Also in this embodiment, the terms packet and frame may be used interchangeably and may comprise one or more symbols and/or values. Additionally, in this embodiment, a value may be "predetermined" if the value, at least in part, and/or one or more algorithms, operations, and/or processes involved, at least in part, in generating and/or producing the value is predetermined, at least in part. In this embodiment, a switch may be or comprise an entity capable of receiving a frame and/or frame fragment via one or more ports of the switch, and forwarding at least a portion of the frame and/or frame fragment via one or more other ports of the switch toward a destination of the frame or frame fragment.

Circuitry 118 may exchange data and/or commands with one or more HC 10 via one or more links 50, and/or circuitry 118 may exchange data and/or commands with MR 60A . . . 60N via one or more links 51A . . . 51N, in accordance with one or more communication protocols. For example, in this embodiment, these one or more protocols may be compatible with, at least in part, e.g., one or more Ethernet, Transmission Control Protocol/Internet Protocol (TCP/IP), User Datagram Protocol/Internet Protocol (UDP/IP), Multimedia Over Coax (MoCA), and/or International Telecommunications Union Telecommunication Standardization Sector (ITU-T) G.hn or other protocols.

For example, one or more Ethernet protocols that may be utilized in system 100 may comply or be compatible with, at least in part, IEEE Std. 802.3-2008, Dec. 26, 2008; IEEE Std. 802.1Q-2005, May 19, 2006; IEEE Std. 802.11a-1999, Feb. 11, 1999; IEEE Std. 802.11b-1999, Feb. 11, 1999; IEEE 802.11g-2003, Oct. 20, 2003; IEEE 802.11n-2009, Oct. 29, 2009; and/or, IEEE P802.1Qat/D6.0, Draft Standard for Local and Metropolitan Area Networks—Virtual Bridged Local Area Networks—Amendment 9: Stream Reservation Protocol (SRP), Apr. 23, 2010 (hereinafter "SRP"). The TCP/IP protocol that may be utilized in system 100 may comply or be compatible with, at least in part, the protocols described in Internet Engineering Task Force (IETF) Request For Comments (RFC) 791 and 793, published September 1981. The UDP/IP protocol that may be utilized in system 100 may comply or be compatible with, at least in part, the protocols described in IETF RFC 768, published August 1980, and RFC 793, published September 1981. The MoCA protocol that may be utilized in system 100 may comply or be compatible with, at least in part, the protocol described in MoCA Specification 2.0, Jun. 19, 2010, by MoCA Alliance. The ITU-T G.hn protocol that may be utilized in system 100 may comply or be compatible with, at least in part, the protocol described in ITU-T Recommendation G.9960, approved Oct. 9, 2009. Many different, additional, and/or other protocols (including, for example, those stated above) may be used for such data and/or command exchange without departing from this embodiment (e.g., earlier and/or later-developed versions of the aforesaid, related, and/or other protocols).

After, for example, a reset or other event of or in one or more HC 10, system 100, and/or communication via one or more links 50, etc., one or more HC 10 may advertise, at least in part, via, for example, one or more advertisements (AD) 153 the availability of one or more packet streams 52 to be transmitted, generated, and/or issued, at least in part, by one or more HC 10. For example, in this embodiment, one or more advertisements 153 may be transmitted, at least in part, via one or more links 50 to one or more receivers 30, and thence, may be transmitted, at least in part, from one or more bridges 20 to MR 60A . . . 60N via links 51A . . . 51N.

In response, at least in part, to one or more advertisements 153, one or more bridges 20 and/or MR 60A . . . 60N may issue, at least in part, one or more listener ready (RDY) messages 157 and/or 155A . . . 155N to one or more HC 10. One or more messages 157 and/or 155A . . . 155N may indicate, at least in part, that one or more receivers 30 and/or 60A . . . 60N are ready to receive, at least in part, one or more streams 52.

In this embodiment, a packet stream, communication stream, or communication may be used interchangeably, and may be or comprise a plurality of packets and/or frames, such as, for example, without limitation, a plurality of packets and/or frames that may be related and/or associated with each other, at least in part (e.g., one or more media streams). Also in this embodiment, one or more advertisements 153 and/or messages 157 and/or 155A . . . 155N may comply and/or be compatible with, at least in part, TSSP.

In response, at least in part, to receipt, at least in part, of one or more messages 157 and/or 155A . . . 155N, one or more HC 10 may commence, at least in part, generation and/or issuance, at least in part, of one or more streams 52 via one or more links 50. For example, in this embodiment, one or more streams 52 may be intended to be multicasted, at least in part, by one or more bridges 20 and/or circuitry 118, as multicast streams 63A . . . 63N, via links 51A . . . 51N to MR 60A . . . 60N. Accordingly, as circuitry 118 receives, at least in part, one or more streams 52, circuitry 118 may multicast, at least in part, the one or more streams 52 to MR 60A . . . 60N, as streams 63A . . . 63N, via links 51A . . . 51N.

However, prior to one or more HC 10 commencing transmission, at least in part, one or more streams 52 via one or more links 50, and/or prior to one or more bridges 20 commencing transmission, at least in part, of one or more streams 63A . . . 63N to MR 60A . . . 60N, one or more HC 10, circuitry 118, and/or one or more MR 60A . . . 60N may negotiate, at least in part, one or more bandwidth reservations BWR to be assigned to one or more portions of one or more streams 52 and/or 63A . . . 63N. In this embodiment, a bandwidth reservation may comprise, at least in part, one or allocations of bandwidth. Also in this embodiment, bandwidth may comprise an amount of data that is and/or is to be propagated, processed, transmitted, and/or received, least in part, per unit time and/or link time associated with such propagation, processing, transmission, and/or reception, at least in part. Additionally, in this embodiment, an assignment of a bandwidth reservation to or for a packet stream may comprise allocation to, use by, and/or association with, at least in part, the packet stream of the bandwidth reserved by and/or in the bandwidth reservation.

For example, as a result, at least in part, of such negotiation, one or more bandwidth reservations BWR may be made (e.g., on a hop-by-hop basis) by one or more HC 10, circuitry 118, and/or MR 60A . . . 60N to one or more streams 52 and/or 63A . . . 63N prior to commencement of communication, transmission, and/or issuance of one or more streams 52 by one or more HC 10 and/or of one or more streams 63A . . . 63N by circuitry 118. In this embodiment, the maximum possible respective bandwidth of and/or associated with, at least in part, one or more links 50 and/or one or more links 51A . . . 51N may be equal to MAX B. In accordance with SRP, the maximum available bandwidth reservable may be equal to 75 percent of MAX B, and the remaining 25 percent of MAX B may be pre-assigned to any communication streams and/or other (e.g., non-stream) communications for which no bandwidth reservations are to be negotiated and/or assigned. For example, in this embodiment, no bandwidth reservation may be assigned to and/or negotiated for one or more frames (F) 65 that do not belong to and/or are not comprised in one or more streams (e.g., one or more frames 65 may not be comprised in any packet stream). Accordingly, these one or more previous bandwidth allocations (e.g., in accordance with SRP) may be assigned, at least in part, to one or more frames 65. In this embodiment, if no other bandwidth reservations are currently active, one or more bandwidth reservations BWR may be less than or equal to the remaining 75 percent of MAX B (e.g., in accordance with and/or subject to the rules of SRP). However, as will be appreciated, depending upon any other and/or additional bandwidth reservations that may be assigned, one or more bandwidth reservations BWR may vary, in accordance with SRP.

In this embodiment, circuitry 118 may be capable of determining, at least in part, whether to delay transmission, at least in part, of one or more frames (e.g., one or more frames 65) in favor of transmitting one or more other frames (e.g., one or more final frames 61N) that belong to one or more packet streams (e.g., one or more streams 52 and/or 63A . . . 63N) that are associated with one or more bandwidth reservations (e.g., one or more bandwidth reservations BWR). For example, circuitry 118 may receive, at least in part, succeeding frames 61A, 61B, . . . 61N that belong to and/or are comprised in one or more streams 52. At least a subset (e.g., comprising frames 61B and/or 61N) of the frames belonging to and/or comprised in one or more streams 52 may be concurrently queued in one or more queues 103 for subsequent multicasting, in and/or as streams 63A . . . 63N by circuitry 118 to MR 60A . . . 60N. In accordance with TSSP, when replicating the received frames from one or more streams 52 as multicast streams 63A . . . 63N, circuitry 118 may space the succeeding frames of the streams 63A . . . 63N in accordance with a regular timing, evenly dividing the bandwidth reservation BWR. In this example, prior to time when one or more frames 61B and/or 61N should be transmitted by circuitry 118 in streams 63A . . . 63N, one or more frames 65 may be selected by NICC 120 and/or circuitry 118 for one or more next available time slots for transmission from NICC 120 and/or circuitry 118 via one or more of the same port or ports (not shown) of one or more bridges 20 via which streams 63A . . . 63N are being multicast. In this embodiment, one or more frames 65 may have, at the time that they are selected for transmission via these next available time slots, a relatively higher transmission priority compared to a relatively lower transmission priority of the one or more frames 61B and/or 61N (received from one or more streams 52) that still remain to be transmitted by circuitry 118 in one or more streams 63A . . . 63N. This may result, at least in part, from the fact that, at the time that one or more frames 65 are selected for such transmission, these next available time slots may not correspond to and/or be allocated to the one or more bandwidth reservations BWR. Accordingly, this may result in the transmission of one or more frames 65 being scheduled and/or selected to occur prior to the transmitting of one or more frames 61B and/or 61N. In this embodiment, the size of one or more frames 65 may be relatively larger (e.g., several times, up to an order of magnitude, or more, greater) than the relatively smaller respective and/or aggregated sizes of the one or more frames 61B and/or 61N. The respective time slots allocated for transmission of one or more frames 65 and one or more frames 61B and/or 61N may be sufficiently close together in time that, given the foregoing, if these frames were to be transmitted in their respective time slots, undesirable amounts of latency may be introduced into the transmission of frames 61B and/or 61N.

However, advantageously, in this embodiment, in order to avoid this undesirable result, circuitry 118 may determine, at least in part, whether to delay the transmission, at least in part, of one or more frames 65 in favor of transmitting one or more frames 61B and/or 61N. For example, circuitry 118 may make this determination, at least in part, based at least in part upon one or more parameters. These one or more parameters may be associated, at least in part, with (1) one or more frames 65 and/or one or more frames 61B and/or 61N, and/or (2) with respective latencies thereof.

For example, as shown in FIG. 2, circuitry 118 may make this determination based at least in part upon one or more functions (illustrated symbolically by curve 210) that depend upon and/or employ, at least in part, these one or more parameters. In this embodiment, these one or more functions 210 and/or one or more parameters may be empirically determined, at least in part, to achieve, at least in part, one or more desired policies concerning the respective latencies of one or more frames 65, and/or one or more frames 61B and/or 61N. These one or more parameters may comprise, for example, one or more current latency-associated parameters and/or one or more past latency-associated parameters.

For example, these one or more current latency-associated parameters may be related to the current state of system 100, and may include (1) the current time period that one or more frames 61B and/or 61N have been waiting (e.g., queued in one or more queues 103) to be transmitted by circuitry 118, (2) the current time period that remains until the arrival of the currently scheduled one or more transmission time slots for one or more frames 61B and/or 61N, and/or (3) amount of time that is expected to be consumed to transmit one or more frames 65. Additionally or alternatively, one or more functions 210 may depend upon, at least in part, one or more past latency-associated parameters related to one or more past states of system 100. These one or more past latency-associated parameters may include, for example, one or more latency-related parameters (e.g., analogous to the above current latency-associated parameters) associated with one or more other (not shown) frames (e.g., from one or more other not shown streams and/or non-stream communications) that were previously transmitted by circuitry 118. Accordingly, depending at least in part upon the one or more parameters selected, one or more functions 210 may be based, at least in part, upon one or more "stateful" and/or "stateless" phenomena, and/or may exhibit one or more open loop and/or closed loop characteristics and/or operations. It should be appreciated that the foregoing is exemplary, and these one or more functions 210 and/or one or more parameters may vary from those described herein without departing from this embodiment.

As shown in FIG. 2, in this example, one or more functions 210 may comprise a piecewise linear function that depends, at least in part, upon two variables/parameters, illustrated by "X" (abscissa) and "Y" (ordinate), that are derived from and/or based upon, at least in part, the foregoing current latency-associated parameters. One or more parameters Y may be equal to the amount of time that is expected to be consumed to transmit one or more frames 65 less the current time period that remains until the arrival of the currently scheduled one or more transmission time slots for one or more frames 61B and/or 61N (i.e., current latency-associated parameter (3) above minus current latency-associated parameter (2) above). One or more parameters X may be equal to the current time period that one or more frames 61B and/or 61N have been waiting (e.g., queued in one or more queues 103) to be transmitted by circuitry 118 (i.e., current latency-associated parameter (1) above). The curve illustrated in FIG. 2 as one or more functions 210 may define a boundary condition between two actions that may be taken by circuitry 118: (1) delaying the currently scheduled/selected transmission of one or more frames 65 in favor of transmitting (e.g., immediately in the one or more transmission time slots currently allocated to one or more frames 65) one or more frames 61B and/or 61N instead, or (2) not so delaying the currently scheduled/selected transmission of one or more frames 65 and transmitting one or more frames 65 in their one or more currently allocated transmission time slots. For example, if, at the time that circuitry 118 determines whether to delay the transmission of one or more frames 65, the current values of Y and X in system 100 define a point that is on or above the curve embodying one or more functions 210, then circuitry 118 may determine to delay such transmission in favor of transmitting one or more frames 61B and/or 61N in the one or more time slots that are currently allocated to one or more frames 65. Conversely, if, at the time that circuitry 118 determines whether to delay the transmission of one or more frames 65, the current values of Y and X in system 100 define a point that is below the curve embodying one or more functions 210, then circuitry 118 may determine not to delay the transmission of one or more frames 65 and may transmit one or more frames 65 in their currently allocated one or more transmission time slots.

In conceptual terms, in this embodiment, if the time that is expected to be consumed to transmit one or more frames 65 is less than the current time period that remains until the arrival of the currently scheduled one or more transmission time slots for one or more frames 61B and/or 61N (i.e., the value of Y is negative), then the transmission of one or more frames 65 in their currently scheduled time slots should not interfere with/delay the transmission of one or more frames 61B and/or 61N. Therefore, in this case, the transmission of one or more frames 65 should not be delayed, since their transmission should not add latency to the transmission of one or more frames 61B and/or 61N and/or to one or more streams 52. Also conceptually, in this embodiment, the longer that the one or more frames 61B and/or 61N have been queued (e.g., waiting for completion of transmission of the preceding frames in stream 52) and/or the longer that it is expected to take to transmit one or more frames 65, the greater the potential interest should be in delaying the transmission of the one or more frames 65 in favor of transmitting one or more frames 61B and/or 61N. Conversely, conceptually, the shorter the time period that the one or more frames 61B and/or 61N have been queued, the greater the potential interest should be in not delaying the transmission of the one or more frames 65. Additionally, conceptually, if the one or more frames 61B and/or 61N have been queued for a substantial period of time, then the transmission of one or more frames 65 should be delayed, notwithstanding that only a relatively small amount of additional latency might be imparted to the transmission of one or more frames 61B and/or 61N as a result of the non-delayed transmission of the one or more frames 65.

The particular characteristics and/or form of the curve embodying one or more functions 210 may be programmed and/or input into circuitry 118 by, for example, network administrator 78 and/or other and/or additional (not shown) operating system/network hardware. In this embodiment, the particular characteristics and/or form of this curve may be empirically determined, at least in part, to permit a desired balancing among potentially competing policies to result. Such potentially competing policies may comprise, for example, (1) reducing (e.g., maximum) transmission latency of one or more frames 61B and/or 61N and/or one or more streams 52, (2) reducing transmission latency of one or more frames 65, and/or (3) the respective transmission priorities of one or more frames 61B and/or 61N and/or one or more streams 52, on the one hand, and of one or more frames 65, on the other hand. In this embodiment, these policies may depend on and/or result from one or more factors, such as, the type of one or more streams 52 (e.g., live vs. non-live), the observation interval associated with the type of one or more streams 52, the maximum desired fraction of the observation interval to be consumed by parameter Y, etc.

Many different functions and/or curves may be implemented and/or embodied by one or more functions 210, without departing from this embodiment. For example, one or more functions 210 may comprise one or more decaying exponential and/or other functions. Also without departing from this embodiment, the number, type, and/or characteristics of the one or more parameters upon which one or more functions 210 may be based and/or depend, at least in part, may vary.

One or more frames 61B and/or 61N may be or comprise one or more intermediate and/or final frames, respectively, of one or more streams 52. However, without departing from this embodiment, one or more other frames (e.g., one or more beginning frames 61A) in one or more streams 52 may be processed in accordance with the principles of this embodiment. Also without departing from this embodiment, one or more frames 65 may be comprised in one or more not shown packet streams that may be allocated one or more bandwidth reservations (e.g., other than and/or in addition to one or more reservations BWR).

In this embodiment, circuitry 118 may be replicated, at least in part, in one or more HC 10 and/or one or more MR 60A . . . 60N. However, alternatively, without departing from this embodiment, among the one or more bridges 20 of network hop HOP B and the neighboring hops HOP A and HOP C to which it may be communicatively coupled, only one or more bridges 20 may comprise, at least in part, such circuitry 118. Advantageously, this may permit circuitry 118 of this embodiment to be implemented solely in a single device (e.g., bridge 20) in system 100, while still permitting interactions among the devices of hops HOP A, HOP B, and HOP C to exhibit full compatibility with TSSP, SRP, and/or other and/or additional protocols.

In this embodiment, if circuitry 118 determines, at least in part, to delay the transmission, at least in part, of one or more frames 65 in favor of transmitting one or more frames 61B and/or 61N, circuitry 118 may queue one or more frames 65 in one or more queues 103, and may transmit, in the one or more next available time slots that had been previously allocated to one or more frames 65, one or more frames 61B and/or 61N as part of one or more streams 63A . . . 63N to MR 60A . . . 60N. After so transmitting one or more frames 61B and/or 61N, circuitry 118 may transmit one or more frames 65.

Conversely, if circuitry 118 determines, at least in part, not to delay the transmission, at least in part, of one or more frames 65, circuitry 118 may transmit one or more frames 65 in their currently allocated time slots, and may continue to queue one or more frames 61B and/or 61N. After so transmitting one or more frames 65, circuitry 118 may transmit one or more frames 61B and/or 61N as part of one or more streams 63A . . . 63N to MR 60A . . . 60N.

Thus, an embodiment may include circuitry that may be capable of determining, at least in part, whether to delay transmission, at least in part, of at least one frame in favor of transmitting at least one other frame. The at least one other frame may belong to at least one packet stream that is associated with at least one bandwidth reservation. The transmission of the at least one frame may be timed to occur prior to the transmitting of the at least one other frame. The at least one frame, at the time that it is selected for transmission, may have a relatively higher transmission priority than a relatively lower transmission priority of the at least one other frame.

In this embodiment, the relative transmission priorities of respective frames may be determined, at least in part, based at least in part upon (1) the respective transmission priorities of the frames, and/or (2) one or more variables, parameters, and/or conditions associated with, employed by, and/or utilized in, at least in part, one or more credit-based shaper algorithms, such as, for example, the "Credit-based shaper algorithm" described in Section 8.6.8.2 of TSSP. For example, in this embodiment, these one or more variables, parameters, and/or conditions may be or comprise one or more "credit" and/or "transmitAllowed" parameters described in Section 8.6.8.2 of TSSP.

Advantageously, in this embodiment, the transmission latency/delay (e.g., the worst case and/or maximum expected latency/delay) of one or more frames 61B and/or 61N and/or one or more streams 52 associated with one or more bandwidth reservations BWR, through system 100, may be reduced, without significantly adversely affecting the latency of one or more non-steam frames 65 that may not be associated with one or more bandwidth reservations. Also advantageously, in this embodiment, the foregoing may be accomplished while maintaining compatibility and/or compliance with one or more relevant protocols (e.g., TSSP and/or SRP).

Many variations, modifications, and alternatives are possible without departing from this embodiment. For example, without departing from this embodiment, one or more bandwidth reservation assignments may be made, at least in part, on an entire communication path basis (e.g., from a sender to a listener). Alternatively or additionally, one or more such assignments may be made, at least in part, by one or more intermediate (e.g., bridge) devices, with or without intervention and/or involvement of, for example, one or more not shown management processes/applications residing at least in part in administrator 78.

Many other and/or additional modifications are possible. Accordingly, this embodiment should be viewed broadly as encompassing all such alternatives, modifications, and alternatives.

What is claimed is:

1. An apparatus comprising:
    circuitry capable of determining, at least in part, that transmission, at least in part, of at least one frame having a relatively higher transmission priority is to be delayed in favor of transmitting at least one other frame having a relatively lower transmission priority relative to the relatively higher transmission priority, the at least one other frame belonging to at least one packet stream that is associated with at least one bandwidth reservation, the transmission of the at least one frame having been previously selected to occur prior to the transmitting of the at least one other frame.

2. The apparatus of claim 1, wherein:
    the circuitry is to perform the determining, at least in part, based, at least in part, upon one or more parameters associated, at least in part, with respective latencies of the at least one frame and the at least one other frame.

3. The apparatus of claim 2, wherein:
    the one or more parameters based, at least in part, upon which the circuitry is to perform the determining, include:
        a wait time period that the at least one other frame has waited to be transmitted;
        a remaining time period until the at least one other frame is to be transmitted in accordance with the at least one bandwidth reservation; and
        a first transmission time period that is expected to be consumed to transmit the at least one frame; and
    the first transmission time period is greater than a second transmission time period that is expected to be consumed to transmit the at least one other frame.

4. The apparatus of claim 2, wherein:
    the circuitry is to perform the determining, at least in part, based, at least in part, upon one or more functions that depend upon, at least in part, the one or more parameters, the one or more functions being determined, at least in part, empirically and being to achieve, at least in part, one or more desired policies concerning the respective latencies, the one or more parameters comprising one or more current latency-associated parameters and one or more past latency-associated parameters.

5. The apparatus of claim 1, wherein:
    the at least one bandwidth reservation is made as a result, at least in part, of negotiation between at least one sender of the at least one packet stream and at least one intended receiver of the at least one stream, the at least one reservation being made prior to commencing transmission of the at least one packet stream from the at least one sender to the at least one intended receiver via the circuitry;
    the at least one intended receiver comprises at least one bridge to be communicatively coupled to media renderers; and
    the at least one packet stream is to be multicasted to the media renderers via the at least one bridge.

6. The apparatus of claim 1, wherein:
    the at least one other frame comprises a final frame in the at least one stream;
    no bandwidth reservation is associated with the at least one frame; and
    the circuitry is capable of being comprised, at least in part, in a bridge.

7. The apparatus of claim 6, wherein:
    the bridge is communicatively coupled to neighboring hops of the at least one packet stream; and
    among the bridge and the neighboring hops, only the bridge is to comprise, at least in part, the circuitry.

8. Non-transitory computer-readable memory storing one or more instructions that when executed by a machine result in performance of operations comprising:
    determining, at least in part, by circuitry that transmission, at least in part, of at least one frame having a relatively higher transmission priority is to be delayed in favor of transmitting at least one other frame having a relatively lower transmission priority relative to the relatively higher transmission priority, the at least one other frame belonging to at least one packet stream that is associated with at least one bandwidth reservation, the transmission of the at least one frame having been previously selected to occur prior to the transmitting of the at least one other frame.

9. The memory of claim 8, wherein:
    the determining, at least in part, is based, at least in part, upon one or more parameters associated, at least in part, with respective latencies of the at least one frame and the at least one other frame.

10. The memory of claim 9, wherein:
    the one or more parameters include:
        a wait time period that the at least one other frame has waited to be transmitted;
        a remaining time period until the at least one other frame is to be transmitted in accordance with the at least one bandwidth reservation; and
        a first transmission time period that is expected to be consumed to transmit the at least one frame; and
    the first transmission time period is greater than a second transmission time period that is expected to be consumed to transmit the at least one other frame.

11. The memory of claim 9, wherein:
    the determining, at least in part, is based, at least in part, upon one or more functions that depend upon, at least in part, the one or more parameters, the one or more functions being determined, at least in part, empirically and being to achieve, at least in part, one or more desired policies concerning the respective latencies, the one or more parameters comprising one or more current latency-associated parameters and one or more past latency-associated parameters.

12. The memory of claim 8, wherein:
    the at least one bandwidth reservation is made as a result, at least in part, of negotiation between at least one sender of the at least one packet stream and at least one intended receiver of the at least one stream, the at least one reservation being made prior to commencing transmission of the at least one packet stream from the at least one sender to the at least one intended receiver; the at least one intended receiver comprises at least one bridge to be communicatively coupled to media renderers; and the at least one packet stream is to be multicasted to the media renderers via the at least one bridge.

13. The memory of claim 8, wherein:

the at least one other frame comprises a final frame in the at least one stream;

no bandwidth reservation is associated with the at least one frame; and the circuitry is capable of being comprised, at least in part, in a bridge.

14. The memory of claim 13, wherein:

the bridge is communicatively coupled to neighboring hops of the at least one packet stream; and among the bridge and the neighboring hops, only the bridge is to comprise, at least in part, the circuitry.

15. A method comprising:

determining, at least in part, by circuitry that transmission, at least in part, of at least one frame having a relatively higher transmission priority is to be delayed in favor of transmitting at least one other frame having a relatively lower transmission priority relative to the relatively higher transmission priority, the at least one other frame belonging to at least one packet stream that is associated with at least one bandwidth reservation, the transmission of the at least one frame having been previously selected to occur prior to the transmitting of the at least one other frame.

16. The method of claim 15, wherein:

the determining, at least in part, is based, at least in part, upon one or more parameters associated, at least in part, with respective latencies of the at least one frame and the at least one other frame.

17. The method of claim 16, wherein:

the one or more parameters include:

a wait time period that the at least one other frame has waited to be transmitted;

a remaining time period until the at least one other frame is to be transmitted in accordance with the at least one bandwidth reservation; and a first transmission time period that is expected to be consumed to transmit the at least one frame; and the first transmission time period is greater than a second transmission time period that is expected to be consumed to transmit the at least one other frame.

18. The method of claim 16, wherein:

the determining, at least in part, is based, at least in part, upon one or more functions that depend upon, at least in part, the one or more parameters, the one or more functions being determined, at least in part, empirically and being to achieve, at least in part, one or more desired policies concerning the respective latencies, the one or more parameters comprising one or more current latency-associated parameters and one or more past latency-associated parameters.

19. The method of claim 15, wherein:

the at least one bandwidth reservation is made as a result, at least in part, of negotiation between at least one sender of the at least one packet stream and at least one intended receiver of the at least one stream, the at least one reservation being made prior to commencing transmission of the at least one packet stream from the at least one sender to the at least one intended receiver;

the at least one intended receiver comprises at least one bridge to be communicatively coupled to media renderers; and the at least one packet stream is to be multicasted to the media renderers via the at least one bridge.

20. The method of claim 15, wherein:

the at least one other frame comprises a final frame in the at least one stream;

no bandwidth reservation is associated with the at least one frame; and the circuitry is capable of being comprised, at least in part, in a bridge.

21. The method of claim 20, wherein:

the bridge is communicatively coupled to neighboring hops of the at least one packet stream; and among the bridge and the neighboring hops, only the bridge is to comprise, at least in part, the circuitry.

* * * * *